US010156302B1

(12) United States Patent
Giattina (10) Patent No.: US 10,156,302 B1
(45) Date of Patent: Dec. 18, 2018

(54) MECHANICAL ELECTRICAL PLUMBING RACK DEVICE

(71) Applicant: BLOX, INC., Birmingham, AL (US)

(72) Inventor: Chris Giattina, Birmingham, AL (US)

(73) Assignee: BLOX, LLC, Birmingham, AL (US)

( * ) Notice: Subject to any disclaimer, the term of this patent is extended or adjusted under 35 U.S.C. 154(b) by 189 days.

(21) Appl. No.: 15/168,470

(22) Filed: May 31, 2016

Related U.S. Application Data

(60) Provisional application No. 62/293,016, filed on Feb. 9, 2016.

(51) Int. Cl.
*F16L 3/26* (2006.01)
*F16L 3/223* (2006.01)
*E04C 2/52* (2006.01)
*H02G 3/34* (2006.01)
*H02G 3/04* (2006.01)

(52) U.S. Cl.
CPC ............... *F16L 3/26* (2013.01); *E04C 2/52* (2013.01); *F16L 3/2235* (2013.01); *H02G 3/0406* (2013.01); *H02G 3/0481* (2013.01); *H02G 3/34* (2013.01)

(58) Field of Classification Search
CPC .. F16L 3/26; F16L 3/2235; E04C 2/52; E04C 2/521; H02G 3/0406; H02G 3/0481
See application file for complete search history.

(56) References Cited

U.S. PATENT DOCUMENTS

| | | | | | |
|---|---|---|---|---|---|
| 1,822,475 | A | * | 9/1931 | Burke | H02G 3/0481 138/111 |
| 2,361,943 | A | * | 11/1944 | Issoglio | F16L 3/2235 174/135 |
| 2,404,531 | A | * | 7/1946 | Robertson | F16L 3/2235 138/106 |
| 3,731,448 | A | * | 5/1973 | Leo | H02G 9/10 52/592.1 |
| 4,036,289 | A | * | 7/1977 | Cheng | F28F 9/0132 122/510 |
| 4,378,923 | A | * | 4/1983 | Takei | B65D 61/00 108/51.3 |
| 4,889,298 | A | * | 12/1989 | Hauff | F16L 5/08 174/503 |
| 6,119,861 | A | * | 9/2000 | Schneider | B65D 61/00 108/53.1 |
| 6,902,138 | B2 | * | 6/2005 | Vantouroux | F16L 3/1091 248/68.1 |
| 7,922,012 | B2 | * | 4/2011 | Sisley | H02G 3/0456 211/26 |

(Continued)

*Primary Examiner* — Paola Agudelo
(74) *Attorney, Agent, or Firm* — C. Brandon Browning; Maynard, Cooper & Gale, PC (57) ABSTRACT

A system for organizing, insulating and supporting pipes within a mechanical/electrical/plumbing (MEP) rack including a composite panel supported in the rack, the composite panel being fabricated from a first non-metallic panel and a second metallic panel, the first panel being adhered to a rear surface of the second panel. A plurality of passageways extend through the composite panel, each passageway being defined by a first opening extending through the first panel and a second opening extending through the second panel. So that the innermost diameter of the first passageway is defined by the first panel, the second opening is arranged concentrically around the first opening.

7 Claims, 10 Drawing Sheets

(56) References Cited

U.S. PATENT DOCUMENTS

| | | | | |
|---|---|---|---|---|
| 8,898,974 | B1* | 12/2014 | Gardner | H02G 3/22 174/68.1 |
| 9,874,014 | B2* | 1/2018 | Reed, II | E04C 2/521 |
| 2011/0088917 | A1* | 4/2011 | Lee | A62C 2/06 169/45 |
| 2014/0138920 | A1* | 5/2014 | Munroe | F16L 39/02 277/606 |
| 2014/0260003 | A1* | 9/2014 | Elsarrag | H01L 35/30 52/173.3 |
| 2016/0102784 | A1* | 4/2016 | Masters | F16L 3/2235 248/68.1 |

* cited by examiner

MECHANICAL ELECTRICAL PLUMBING RACK DEVICE

RELATED APPLICATIONS

This application claims priority to U.S. Provisional Patent Application No. 62/293,016, filed on Feb. 9, 2016 and titled "Mechanical Electrical Plumbing Rack Device," the entire of contents of which are incorporated herein by reference.

FIELD OF INVENTION

The present invention relates to a mechanical electrical plumbing corridor rack device, and more particularly, to a system for organizing, insulating and supporting pipes within a mechanical electrical plumbing corridor rack.

BACKGROUND OF INVENTION

Multi-trade offsite prefabrication refers to a building construction method by which multiple building components are constructed in an offsite facility for subsequent incorporation into a building under construction. Healthcare facilities such as hospitals and clinics are well suited to this process since they require the construction of complex, but repetitive elements such as patient rooms, patient bathrooms, clinical spaces and so-called mechanical/electrical/plumbing (MEP) systems.

MEP systems consist of racks which extend horizontally above a ceiling in a room or vertically within a wall. MEP systems in the healthcare setting typically include a rectangular frame configured for supporting heat, ventilation and air conditioning (HVAC) ducts and pipes for carrying water, electrical wiring and gasses such as oxygen. The frames are arranged to align the HVAC ducts and pipes supported by the frames with the ducts and pipes of adjacent MEP racks.

SUMMARY OF INVENTION

The present application is directed to a system for organizing, insulating and supporting pipes within a MEP rack. According to one aspect of the invention, the present invention provides a MEP corridor rack including a frame having a first end and a second end and a composite panel supported in the first end of the frame, the composite panel being fabricated from a first non-metallic panel, a second metallic panel and an optional, third metallic panel, the first panel being adhered to a rear surface of the second panel or, optionally, sandwiched between the second panel and the third panel. A plurality of passageways extend through the composite panel, each passageway being defined by a first opening extending through the first panel, a second opening extending through the second panel and, optionally, a third opening extending through the third opening. So that the innermost diameter of the first passageway is defined by the first panel, the second opening and the third opening are arranged concentrically around the first opening.

One end of a first metal pipe extends through and is supported by a first passageway of the plurality of passageways, and a second end of the pipe extends through a first hole in a fourth panel that is positioned in and supported by the second end of the frame. By "pipe" it is meant any elongate cylinder, regardless of its cross-sectional shape. Thus, pipe may refer to ductile iron pipe, ductwork and the like. So that the first pipe may be identified and distinguished from other pipes extending within the frame, the second panel and the fourth panel each include a first means for identifying the first pipe and distinguishing the first pipe from other pipes of the plurality of pipes. The first means may also identify a material intended to be contained or transported within the first pipe. Exemplary materials, include electrical wiring which can be designated by the letter "E" being placed adjacent to the first passageway and the first hole, hot water which can be designated by the letters "HW" being placed adjacent to the first passageway and the first hole, cold water which can be designated by the letters "CW" being placed adjacent to the first passageway and the first hole and oxygen gas which can be designated by the term "O2" being placed adjacent to the first passageway and the first hole.

According to another aspect of the invention there is provided a MEP corridor rack including a frame having a first end and a second end, a first panel constructed from metal, the first panel being positioned in and supported by the first end of the frame and including a first plurality of passageways extending through the first panel, and a second panel constructed from metal, the first panel being positioned in and supported by the second end of the frame and including a second plurality of passageways extending through the second panel. A first metal pipe extends through and is supported by a first passageway of the first plurality of passageways and a second passageway of the second plurality of passageways. To prevent galvanic corrosion of the first pipe, the first metal pipe is spaced apart from first passageway and the second passageway. This is accomplished by providing a first non-metallic member that extends to and between the first pipe and a sidewall of the first passageway and a second non-metallic member that extends to and between the first pipe and a sidewall of the second passageway. In use, the rack may include other mechanical, electrical or plumbing components such as HVAC ductwork and may be arranged adjacent to another MEP rack so that the first pipe can be fluidly coupled to a second pipe of the other MEP rack.

According to yet another aspect of the invention there is provided a method of installing pipes including coupling a first panel to a first end section of a frame of a first MEP corridor rack, the first panel including a plurality of first openings therethrough. Each of the first openings of the plurality of first openings is associated with a first indicia displayed on the first panel that identifies a material that is intended to be transported through the first opening. A second panel is coupled to a second end section of the frame that is opposite the first end, the second panel including a plurality of second openings therethrough. Similar to the first panel, each second opening of the plurality of second openings is associated with second indicia that are displayed on the second panel that identifies a material that is intended to be transported through the second opening. With the first and second panels coupled to the frame, a first pipe that is intended for transporting a first material is selected and the first and second openings through which the first material is intended to travel are identified by reading the first and second indicia. The pipe is then inserted the first and second openings that were identified as the first and second openings through which the first material is intended to travel. Preferably, each of the first and second panels are constructed from a non-metallic panel, a first metal panel and a second metal panel wherein the non-metallic panel is sandwiched between the first metal panel and the second metal panel. This arrangement allows the first pipe to be directly supported within the first and second openings on the non-metallic panel without contacting the first pipe with the first and second metallic panels.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION OF THE DRAWINGS

Before the present compositions, articles, devices, and/or methods are disclosed and described in detail, it is to be understood that they are not limited to specific methods unless otherwise specified, or to particular reagents unless otherwise specified, and as such may vary. It is also to be understood that the terminology as used herein is used only for the purpose of describing particular embodiments and is not intended to be limiting.

Figure 1:
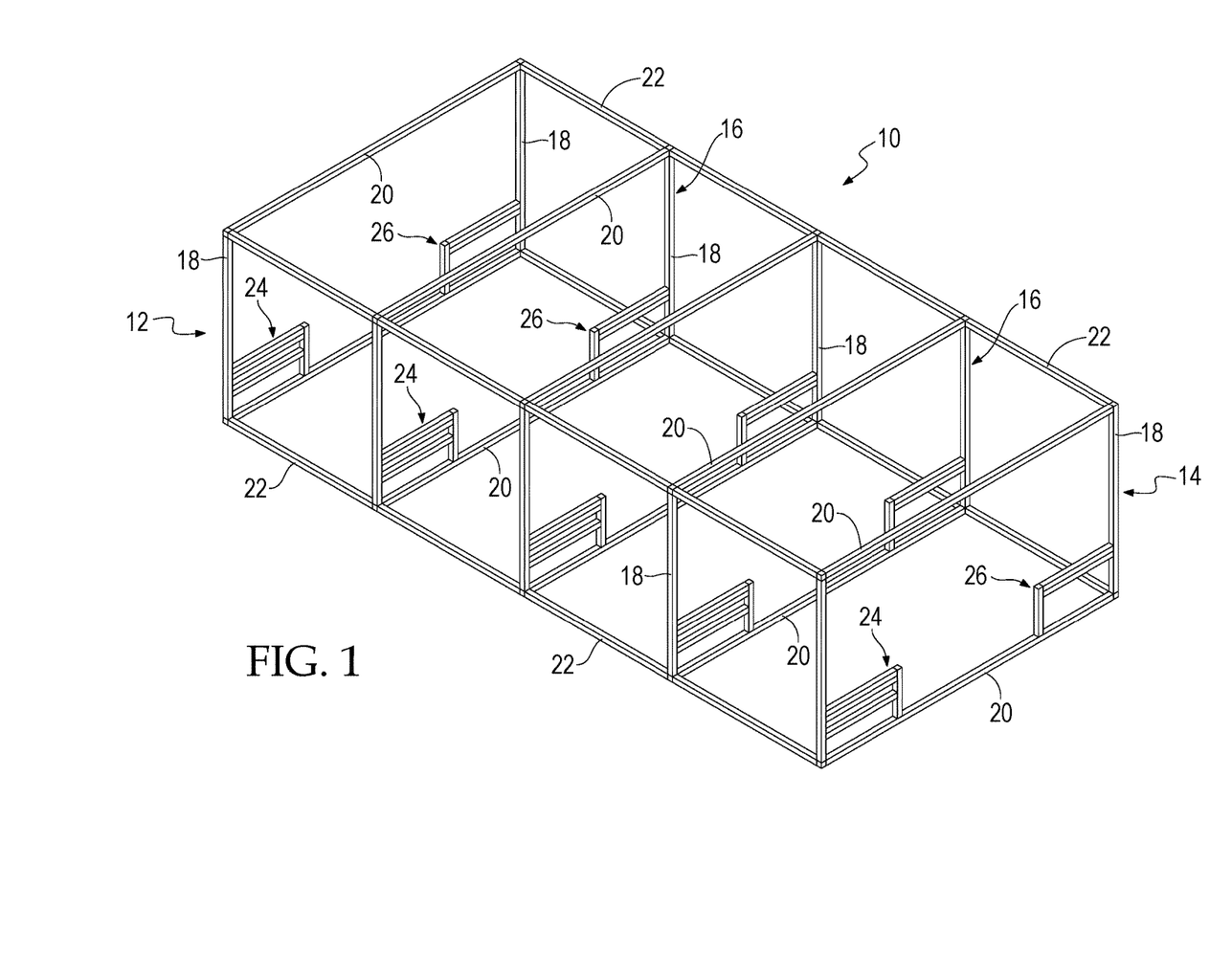
FIG. 1 is a perspective view of a MEP corridor rack in accordance with the present invention.

FIG. 1 depicts a MEP corridor rack 10 in accordance with the present invention. Rack 10 includes five rectangular frame units consisting of a back frame unit 12, a front frame unit 14, and three interior frame units 16. Each of frame units 12, 14 and 16 includes an opposing pair of vertical beams 18 that are arranged in parallel and coupled to the one another along their respective ends by an opposing pair of horizontal beams 20. Units 12, 14 and 16 are aligned and coupled to one another by four horizontal beams 22 to form rack 10. Each of frame units 12, 14 and 16 includes two pipe holder frames including a first pipe holder frame 24 and a second pipe holder frame 26.

Figure 2:
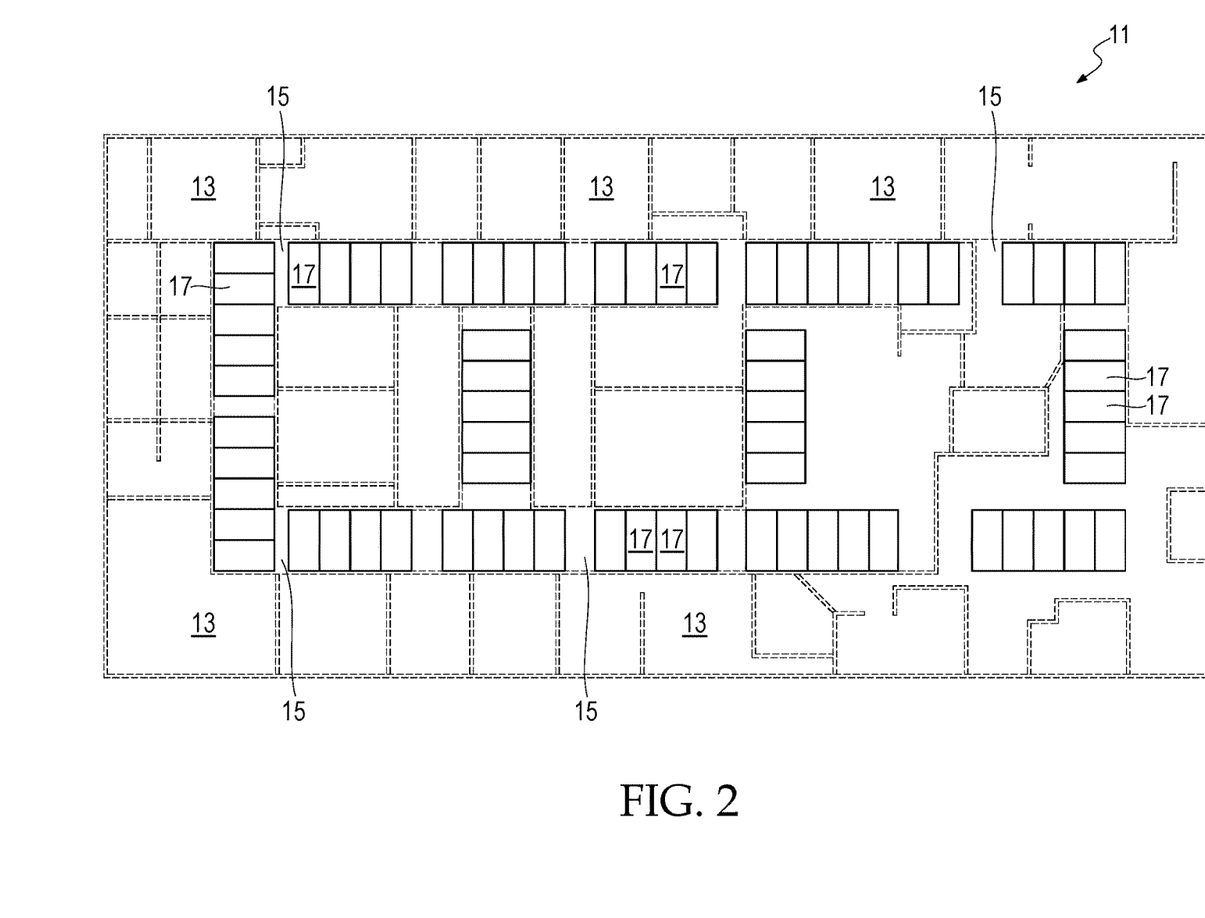
FIG. 2 is an architectural drawing of a building displaying an arrangement of multiple MEP corridor racks.

FIG. 2 depicts a floor plan for a building 11 including patient rooms 13 and hallways 15. Displayed on the floor plan are MEP corridor racks 17. Racks 17 are horizontally racks arranged above the ceiling of hallways 15. FIG. 2 illustrates the modular construction of buildings that incorporate MEP racks.

Figure 3:
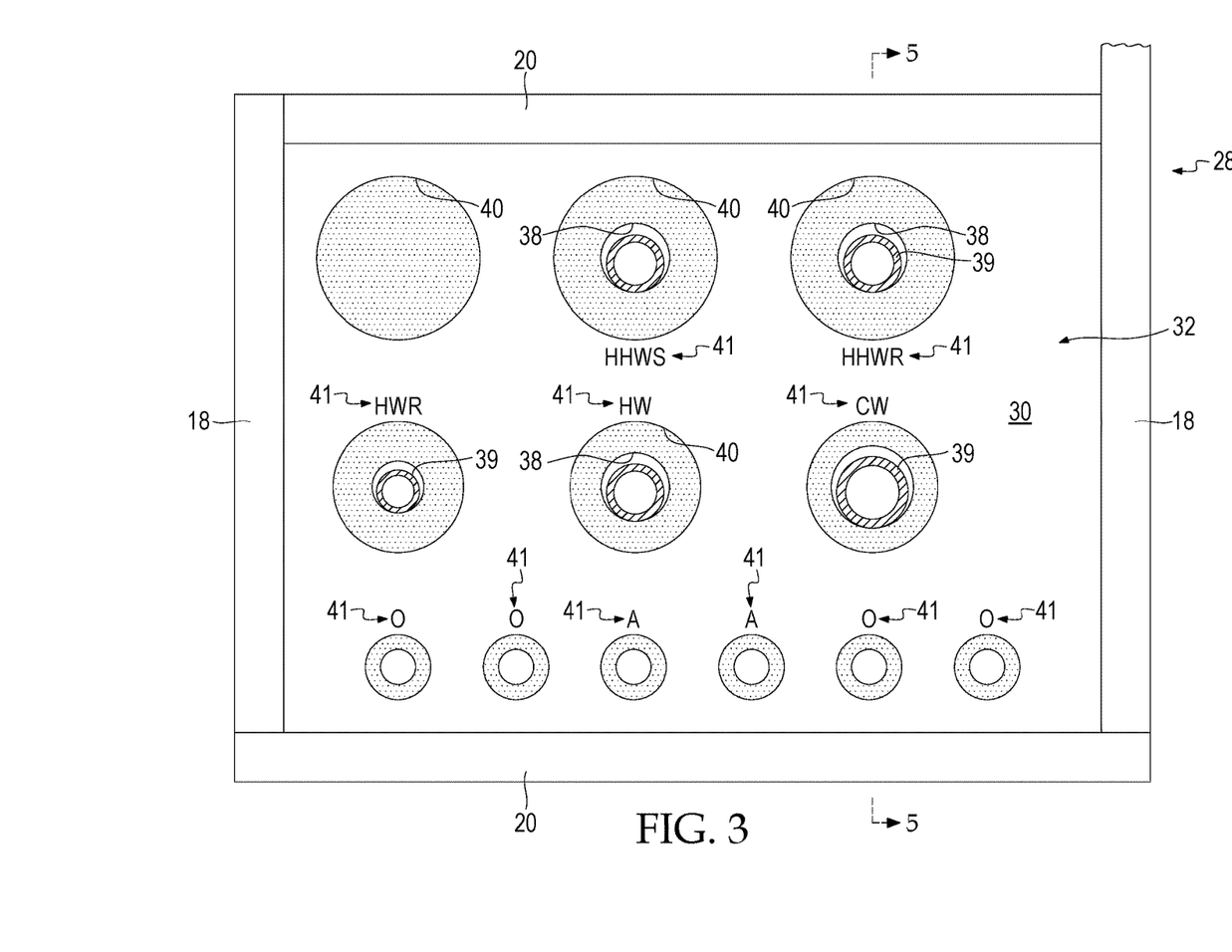
FIG. 3 is a front plan view of a first pipe holder in accordance with the present invention.
Figure 4:
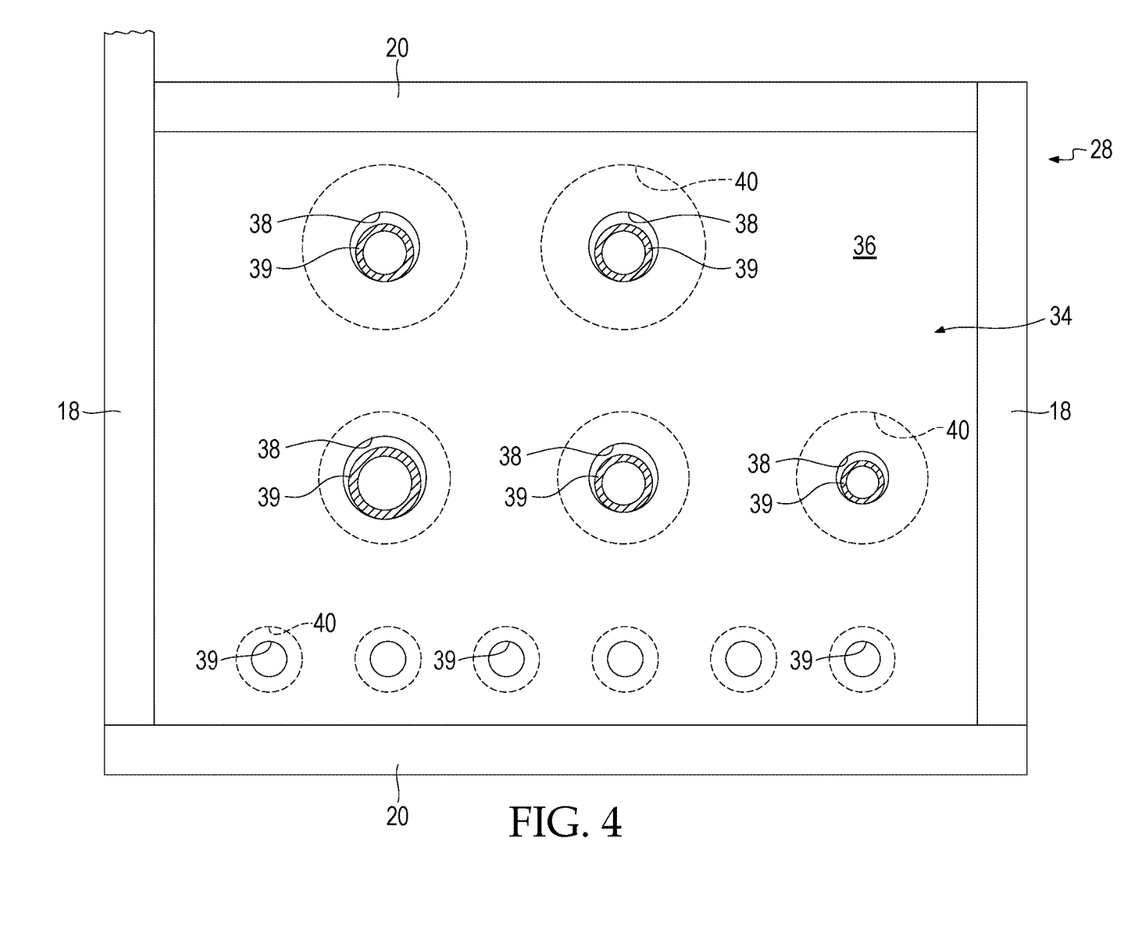
FIG. 4 is a rear plan view of the first pipe holder of FIG. 3.
Figure 5:
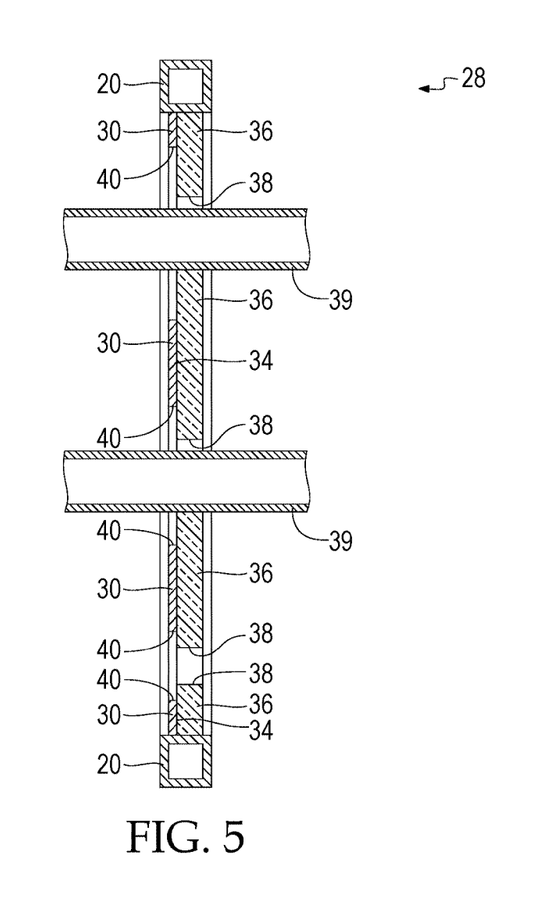
FIG. 5 is a sectional view of the first pipe holder of FIG. 3 through line 5-5.

FIGS. 3 through 5 depict a first pipe holder 28 in accordance with the present invention. First pipe holder 28 includes a substantially flat, rectangular metal first panel 30 constructed from an aluminum or steel metal sheet. First panel 30 has a front surface 32 and a rear surface. Adhered to the rear surface of first panel 30 is a non-metal second panel 36. Second panel 36 includes as exposed surface 34 and is manufactured from an insulating, non-conductive material such as closed-cell extruded polystyrene, cellulose-based products such as wood and cork, fiberglass, rock and slag wool or concrete. Second panel 36 can be adhered to first panel 30 using an adhesive such a glue or second panel 36 can be bolted or nailed to first panel 30.

Extending through panels 30 and 36 are a plurality of openings configured for supporting pipes such as metal pipes. In particular, each opening includes a first hole 38 having a sidewall formed by the second panel 36 and a second hole 40 having a sidewall formed by the first panel 30. In each instance, second hole 40 has a greater diameter than the diameter of the first hole 38 with which it corresponds. Extending through the plurality of openings are pipes 39. Since each opening has an innermost diameter that defined and formed exclusively by second panel 36, pipes 39 are spaced part from and do not come in contact with first panel 30. As such, the conduction of heat into and out of pipes 39 via pipe holder frame 28 is reduced since the pipes 39 contact only an insulating material when passing through the opening. Furthermore, by maintaining a distance between pipes 39 and first panel 30, galvanic corrosion is prevented since the configuration of the opening prevents any metal to metal contact between the pipes and first panel 30.

Referring to FIG. 3, displayed on front surface 32 of first panel 30 are indicia 41 which are engraved into first panel 30. Each of the indicia is associated with a particular one of the openings. The indicia may designate the materials that are to be transported through the openings, for example, an opening may be associated with the letters "CW" to designate that the material to be transported through that pipe 39 will be cold water or the letters "HW" to designate that the material to be transported through that pipe 29 will be hot water. Other indicia may include "HHWS which designates heating hot water supply, "HHWR" which designates heating hot water return, and "HWR" which designates hot water recirculating.

Figure 6:
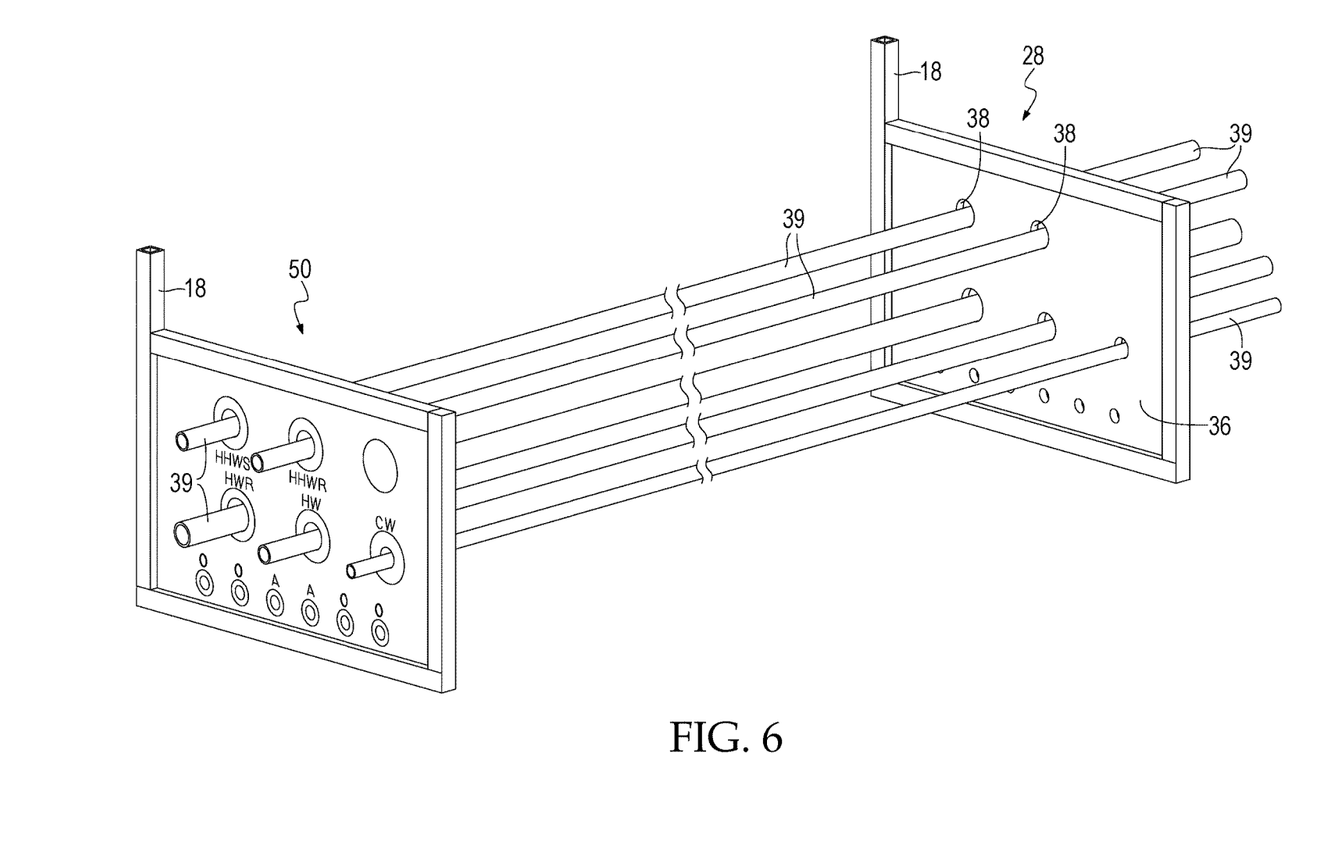
FIG. 6 is a front perspective view of a second pipe holder in accordance with the present invention mounted in the MEP corridor rack of FIG. 1 displaying pipes being supported by and extending between the first pipe holder and the second pipe holder of FIG. 3.

FIG. 6 illustrates a second pipe holder 50 that is aligned with first pipe holder 28 and pipes 39 being supported by and extending between first pipe holder 28 and the second pipe holder 50. Second pipe holder 50 is essentially identical to first pipe holder 28 except that the indicia are reversed, i.e., the indicia of second pipe holder 50 are displayed as a mirror image of the indicia of first pipe holder 28. Thus, indicia 41 of first pipe holder 28 are aligned with like-indicia 41 of second pipe holder 50. Alignment of the like-indicia allows workers to identify which of the plurality of openings through which specific pipes are intended to extend. Thus, workers may properly insert the intended pipes through rack 10 beginning from either back frame unit 12 or front frame unit 14.

Figure 7:
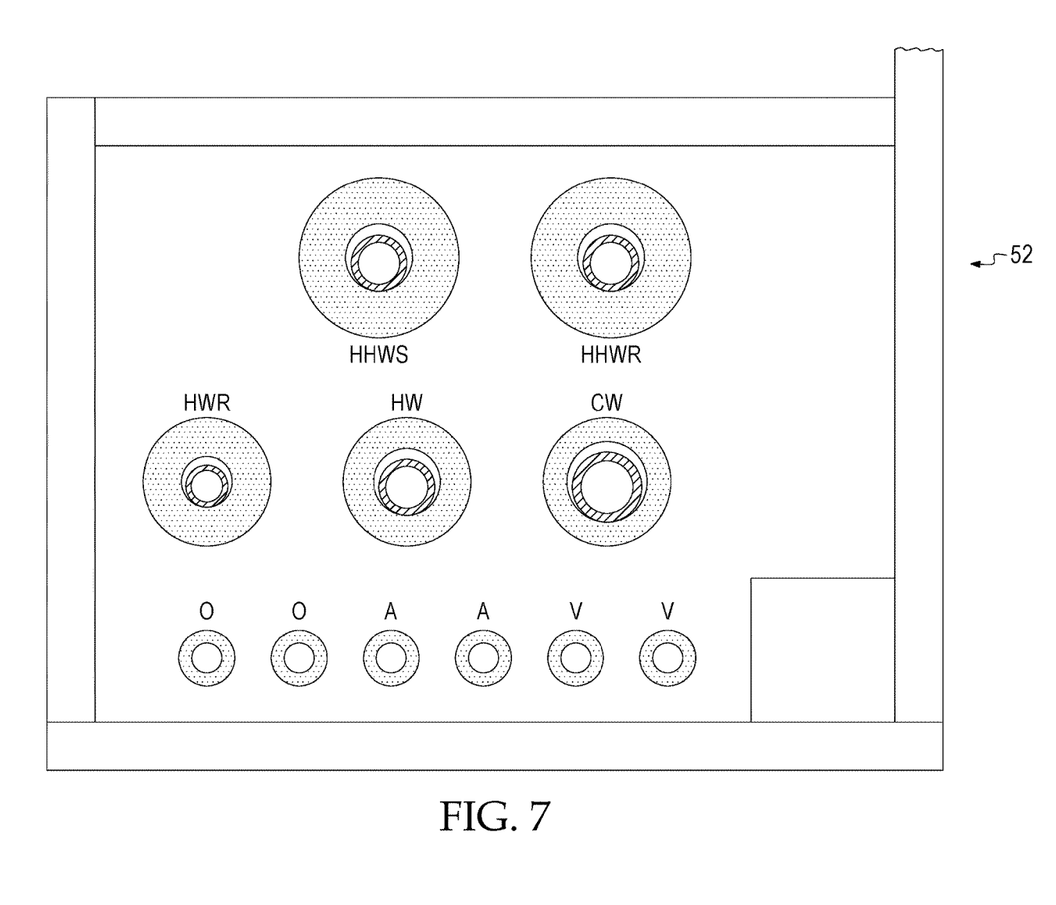
FIG. 7 is a front perspective view of a third pipe holder in accordance with the present invention.
Figure 8:
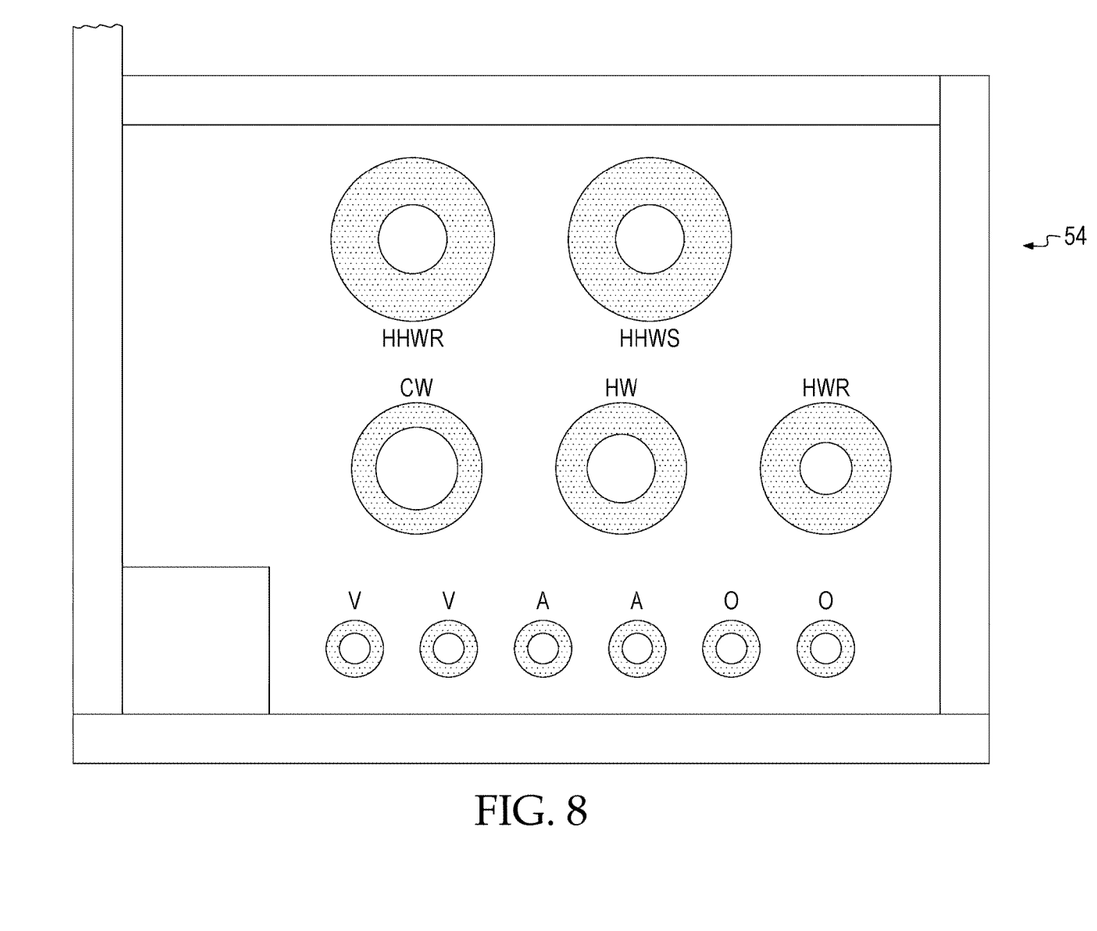
FIG. 8 is a front perspective view of a fourth pipe holder in accordance with the present invention mounted in the MEP corridor rack of FIG. 1 displaying pipes being supported by and extending between the fourth pipe holder and the third pipe holder of FIG. 7.

FIG. 7 illustrates a third pipe holder 52 having a different configuration of openings and indicia than the first and second pipe holders 28 and 50. FIG. 8 illustrates a fourth pipe holder 54 where the openings and indicia configurations are aligned and correspond with the indicia and opening configuration of third pipe holder 52.

Figure 9:
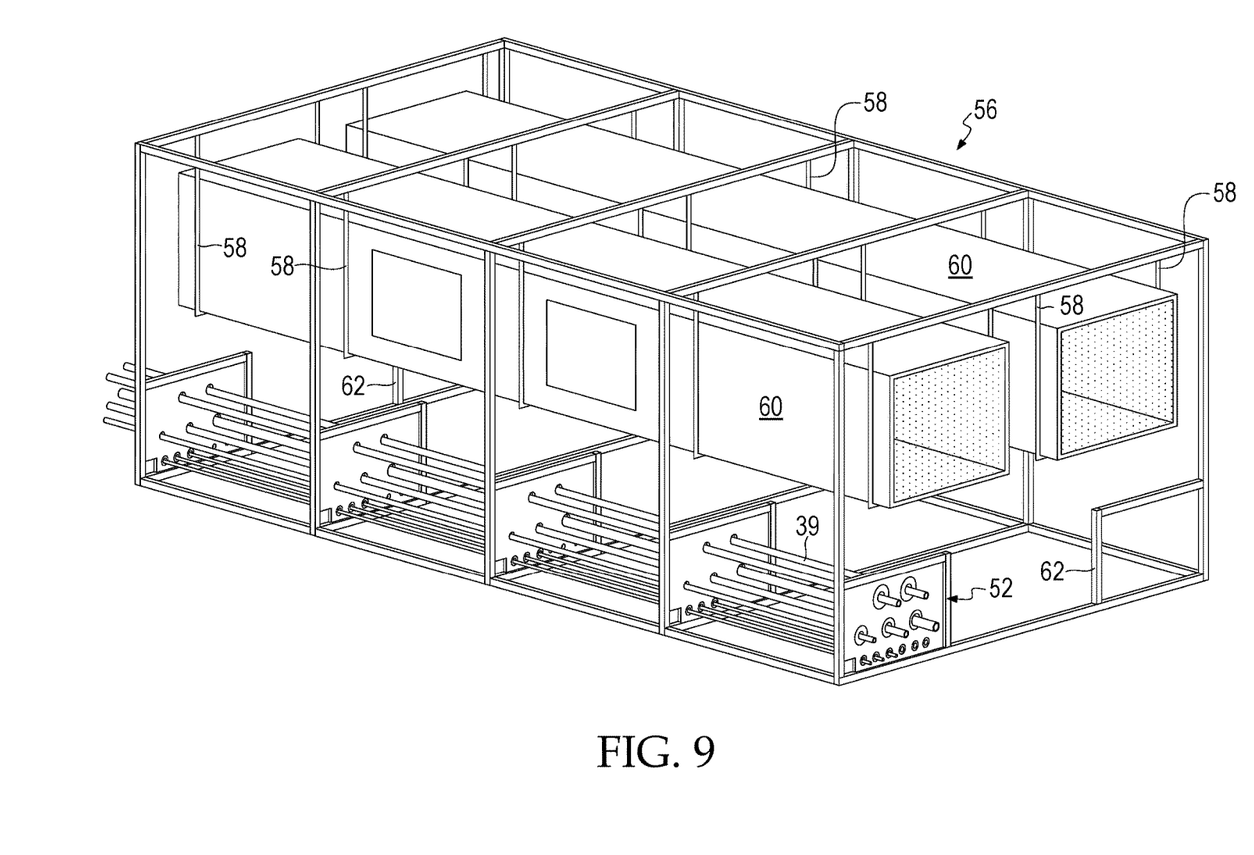
FIG. 9 is a perspective view of an end of the MEP rack of FIG. 1 displaying the third pipe holder of FIG. 7.
Figure 10:
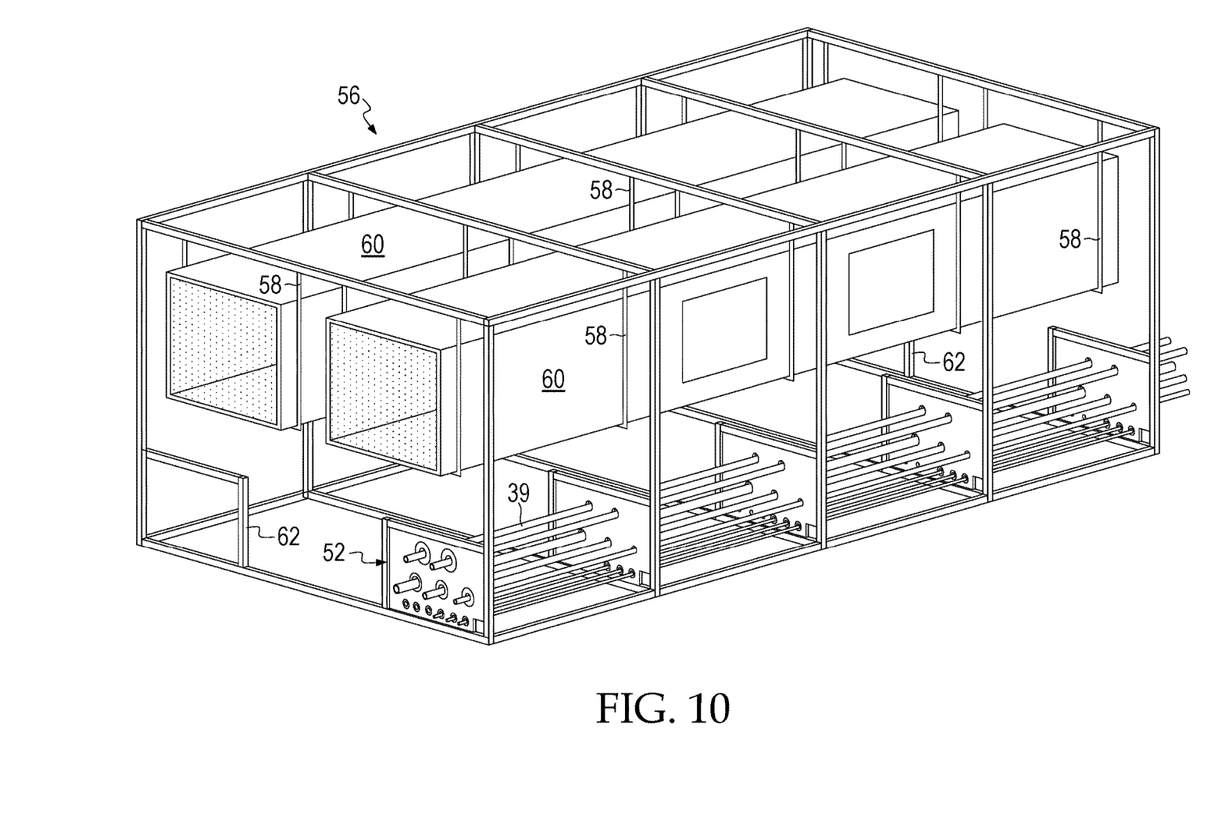
FIG. 10 is a perspective view of the other end of the MEP rack of FIG. 9 displaying the fourth pipe holder of FIG. 8.

FIG. 9 illustrates an end of a MEP rack 56 displaying third pipe holder 52. Rack 56 includes framing 58 for supporting HVAC ductwork 60, as well as framing 62 for supporting additional pipes. Framing 62 may or may not provide insulted support of pipes. FIG. 10 illustrates the other end of MEP rack 56 supporting fourth pipe holder 54.

What is claimed is:

1. A mechanical electrical plumbing corridor rack comprising:
   a frame having a first end and a second end,
   a nonmetallic first panel,
   a metal second panel coupled to the first panel thereby forming a composite panel, the composite panel being positioned in and supported by the second end of the frame and including a plurality of passageways extending therethrough, and
   a first metal pipe extending through and supported within a first passageway of the plurality of passageways,
   wherein the first metal pipe is in direct contact with the first panel and spaced apart from the second panel;
   wherein the first passageway is defined by a first panel sidewall and a second panel sidewall, the first panel sidewall directly supporting the first pipe and the second panel sidewall being spaced apart from the first pipe.

2. The rack of claim 1 wherein the composite panel includes a first means for identifying the first pipe and distinguishing the first pipe from other pipes extending through other passageways of the plurality of passageways.

3. The rack of claim 2 wherein the first means identifies a material intended to be contained or transported within the first pipe.

4. The rack of claim 1 wherein the first pipe is spaced apart from all metallic pieces of the frame and all metallic components supported by or within the frame.

5. The rack of claim 1 comprising ductwork extending between and supported by the first end and the second end of the frame.

6. The rack of claim 1 wherein the first pipe is fluidly coupled to a second pipe that extends through a third panel that is supported by and within another mechanical electrical plumbing corridor rack.

7. The rack of claim 1 wherein the first passageway is defined by a first panel opening and a second panel opening, the first panel opening having a diameter that is less than a diameter of the second panel opening.

* * * * *